UNITED STATES PATENT OFFICE.

LEOPOLD HESSE AND OSCAR GÜNTHER, OF ELBERFELD, AND ARTHUR ZART, OF VOH-
WINKEL, NEAR ELBERFELD, GERMANY, ASSIGNORS TO FARBENFABRIKEN VORM.
FRIEDR. BAYER & CO., OF ELBERFELD, GERMANY, A CORPORATION OF GERMANY.

AZO DYE.

933,562.  Specification of Letters Patent.  Patented Sept. 7, 1909.

No Drawing.  Application filed April 8, 1909. Serial No. 488,586.

*To all whom it may concern:*

Be it known that we, LEOPOLD HESSE, OSCAR GÜNTHER, and ARTHUR ZART, doctors of philosophy, chemists, citizens of the German Empire, residing at, respectively, Elberfeld, and Vohwinkel, near Elberfeld, Kingdom of Prussia, Germany, have invented new and useful Improvements in New Azo Dyestuffs, of which the following is a specification.

Our present invention relates to the manufacture and production of new secondary disazo dyestuffs dyeing cotton from red to blue shades which are remarkable for their extraordinary fastness to light.

The new dyes are obtained by first producing aminoazo compounds from diazotized amins of the benzene series containing a negative group in ortho-position to the amino-group with suitable amins, then diazotizing these intermediate products and combining the thus produced diazoazo compounds with 2-amino-5-naphthol compounds having the formula:

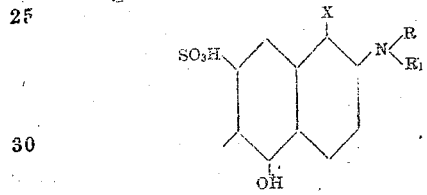

(X meaning hydrogen or $SO_3H$; R meaning hydrogen or a substituent, $R_1$ meaning a substituent).

To produce the aminoazo compounds from diazo compounds which combine only with difficulty one can make use of the process described in British Letters Patent 11343 of 1899.

The new dyestuffs are in the shape of their alkaline salts dark powders easily soluble in water and soluble in concentrated sulfuric acid with from a violet to green color. Upon reduction with stannous chlorid and hydrochloric acid the dyestuffs are decomposed, an ortho-substituted amin of the benzene series, a diamin and a derivative of a 2.6-diamino-5-naphthol compound having the formula:

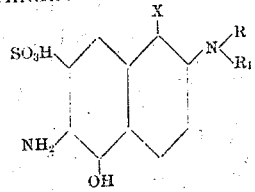

are obtained.

In order to carry out this process we can e. g. proceed as follows, the parts being by weight: 223 parts of meta-xylidin-ortho-sulfonic acid (sodium salt) are diazotized with 69 parts of sodium nitrite and the necessary quantity of hydrochloric acid and the diazo compound thus produced is then combined with 156.5 parts of para-xylidin hydrochlorid in the usual way with the addition of sodium acetate, the intermediate compound is redissolved in water and is then rediazotized at 15–20° C., the diazo compound is salted out and filtered off. It is then stirred up with water to a paste and is added to a solution of 315 parts of 2-phenylamino-5-naphthol-7-sulfonic acid containing an excess of sodium carbonate. The dyestuff is then isolated in the usual way. It is after being dried and pulverized in the shape of its sodium salt a dark green powder soluble in water with a violet color and soluble in concentrated sulfuric acid with a blue color. By reduction with stannous chlorid and hydrochloric acid the dye is decomposed meta-xylidin-ortho-sulfonic acid, 2.5-dimethyl-1.4-diaminobenzene and 2-phenylamino-6-amino-5-naphthol-7-sulfonic acid are formed. It dyes cotton fast reddish-violet shades.

The process is carried out in an analogous manner on starting from other amins containing a negative group in ortho-position to the amino-group, such as anilin-ortho-sulfonic acid, para-toluidin-ortho-sulfonic acid, para-chloro-anilin-ortho-sulfonic acid, para-nitranilin-ortho-sulfonic acid, orthonitranilin-para-sulfonic acid, anilin-2.4-disulfonic acid, or on using other amins to form the aminoazo compounds, such as anilin, cresidin, alpha-naphthylamin, alpha-naphthylamin-6- or 7-sulfonic acid, or on using other of the above mentioned end components, such as 2-ethylamino-5-naphthol-7-sulfonic acid, 2-paratolylamino-5-naphthol-7-sulfonic acid, 2-diethylamino-5-naphthol-7-sulfonic acid, 2 benzylamino 5 naphthol 1.7 disulfo acid, etc.

We claim:

1. The herein described new azo dyestuffs obtainable from aminoazo compounds which contain in the first component which is a benzene derivative a negative group in ortho-position to the amino-group with the hereinbefore defined 2-amino-5-naphthol compounds, which dyestuffs are, after being dried and pulverized, in the shape of their alkaline salts dark powders soluble in water, soluble in concentrated sulfuric acid with from a violet to green color; yielding upon reduction with stannous chlorid and hydrochloric acid an ortho-substituted amin of the benzene series, a diamin and a derivative of a 2.6-diamino-5-naphthol compound of the above given formula; and dyeing cotton from red to blue shades, substantially as described.

2. The herein-described new azo dyestuff which can be obtained from meta-xylidin-ortho-sulfonic acid, para-xylidin and 2-phenylamino-5-naphthol-7-sulfonic acid, which dyestuff is, after being dried and pulverized, in the shape of its sodium salt a dark green powder, which is soluble in water with a violet color and which is soluble in concentrated sulfuric acid with a blue color; yielding upon reduction with stannous chlorid and hydrochloric acid meta-xylidin-ortho-sulfonic acid, 2.5-dimethyl-1.4-diaminobenzene and 2-phenylamino-6-amino-5-naphthol-7-sulfonic acid; and dyeing cotton reddish-violet shades, substantially as described.

In testimony whereof we have hereunto set our hands in the presence of two subscribing witnesses.

LEOPOLD HESSE. [L. s.]
OSCAR GÜNTHER. [L. s.]
ARTHUR ZART. [L. s.]

Witnesses:
OTTO KÖNIG,
C. J. WRIGHT.